(12) United States Patent
Ji et al.

(10) Patent No.: US 11,873,876 B2
(45) Date of Patent: Jan. 16, 2024

(54) DYNAMIC BALANCE TYPE VERTICAL VIBRATION ISOLATOR

(71) Applicant: Beijing University of Technology, Beijing (CN)

(72) Inventors: Jinbao Ji, Beijing (CN); Weiqi Zhang, Beijing (CN); Sen Yang, Beijing (CN); Zongxiang Hu, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 17/896,112

(22) Filed: Aug. 26, 2022

(65) Prior Publication Data
US 2023/0184309 A1    Jun. 15, 2023

(30) Foreign Application Priority Data
Dec. 11, 2021    (CN) .......................... 202111512764.5

(51) Int. Cl.
*F16M 11/22* (2006.01)
*F16F 15/02* (2006.01)

(52) U.S. Cl.
CPC ........... *F16F 15/022* (2013.01); *F16M 11/22* (2013.01); *F16F 2222/08* (2013.01);
(Continued)

(58) Field of Classification Search
CPC ................ F16F 15/022; F16F 2222/08; F16F 2228/066; F16F 2232/08; F16F 7/104; F16F 15/02; F16M 11/22; F16M 2200/00
(Continued)

(56) References Cited

U.S. PATENT DOCUMENTS

| 3,145,012 A | * | 8/1964 | Kfoury | ...................... | F16F 7/08 |
| | | | | | 188/380 |
| 5,566,156 A | * | 10/1996 | Choi | ...................... | G11B 33/08 |
| | | | | | 360/99.06 |

(Continued)

FOREIGN PATENT DOCUMENTS

| CN | 104132089 A | 11/2014 |
| CN | 111549927 A | 8/2020 |

*Primary Examiner* — Terrell L McKinnon
*Assistant Examiner* — Jerry Nmn Olivier
(74) *Attorney, Agent, or Firm* — Bayramoglu Law Offices LLC

(57) ABSTRACT

A dynamic balance type vertical vibration isolator includes slide blocks, balance springs, mass blocks, a fixed block, rotation shafts, stiffness-adjustable springs, etc. When an earthquake force is upward, the stiffness-adjustable springs are compressed, upward forces of the stiffness-adjustable springs are increased, meanwhile, the slide blocks and the mass blocks move away from the fixed block, the balance springs are stretched to generate pull forces, and the pull forces have vertically upward components, so as to reduce compression degrees of the stiffness-adjustable springs, and further to reduce the upward forces of the stiffness-adjustable springs. Similarly, when the earthquake force is downward, the stiffness-adjustable springs are stretched, downward forces of the stiffness-adjustable springs are increased, meanwhile, the slide blocks and the mass blocks move close to the fixed block, the balance springs are compressed to generate compression forces, and the compression forces have vertical downward components.

4 Claims, 1 Drawing Sheet

(52) U.S. Cl.
CPC ..... *F16F 2228/066* (2013.01); *F16F 2232/08* (2013.01); *F16M 2200/00* (2013.01)

(58) Field of Classification Search
USPC .......................... 248/638, 624, 636; 52/167.1
See application file for complete search history.

(56) References Cited

U.S. PATENT DOCUMENTS

| | | | | |
|---|---|---|---|---|
| 2012/0175489 A1* | 7/2012 | Taylor | ................... | F16F 15/022 |
| | | | | 248/563 |
| 2013/0328253 A1* | 12/2013 | Kraner | ................. | F16F 15/002 |
| | | | | 267/140.14 |
| 2021/0301900 A1* | 9/2021 | Zhou | ..................... | F16F 15/022 |

* cited by examiner

DYNAMIC BALANCE TYPE VERTICAL VIBRATION ISOLATOR

CROSS REFERENCE TO THE RELATED APPLICATIONS

This application is based upon and claims priority to Chinese Patent Application No. 202111512764.5, filed on Dec. 11, 2021, the entire contents of which are incorporated herein by reference.

TECHNICAL FIELD

The present disclosure relates to a dynamic balance type vertical vibration isolator, which is a vertical vibration isolator for apparatuses, and belongs to the field of structural vibration control.

BACKGROUND

Vibration isolators are used for apparatuses. Nowadays, the research on horizontal vibration isolators is relatively mature at home and abroad, but no sophisticated solutions have been provided for research on vertical vibration isolators yet. The reason is that the vertical vibration isolators are required to play a role in vibration insulation, and meanwhile to balance the dead weight of apparatuses subjected to vibration insulation, which leads to height difficulties in design and machining, and it is difficult to achieve the two functions simultaneously when an earthquake happens.

At present, thick rubber, spring bearings, pneumatic and hydraulic bearings, etc. are the main vibration isolators for vertical vibration isolation of apparatuses. The patent with the application number of 202010380679.7 provides a three-dimensional composite vibration isolator, which is composed of an upper vertical disc spring vibration isolator body and a lower horizontal thick rubber bearing, where an upper bearing body and a lower bearing body are connected and anchored to an external structure by means of bolts to form a whole, so as to provide excellent horizontal vibration isolation and vertical vibration isolation, and further to improve the bearing capacity and stability. Yamin Zhao et al. provide a three-dimensional vibration isolator composed of disc springs. Vibration table test results show that a vibration isolation layer of a structure vertically deforms severely, while layers of an upper structure relatively move slightly, such that a vertical vibration isolation effect is obvious. Fujita develops an intelligent air spring vibration isolation system composed of an air spring bearing and an earthquake early-warning device, and develops an intelligent air bearing vibration isolation system having an earthquake early-warning function. When no earthquake happens, compressed air accumulates in an air storage tank. When an earthquake happens, an earthquake early-warning system and a longitudinal wave sensor detect earthquake waves to determine whether the vibration isolation system is required to be activated, if yes, an electromagnetic valve is opened, a compressor is started to convey compressed air to an air bearing, and at this time, horizontal and vertical vibration isolation of a structure subjected to vibration isolation is realized by means of the air bearing. The patent with the application number of 201410301724.X provides a liquid bag type vibration isolator for vibration isolation of cultural relics and display cabinets, which has horizontal and vertical vibration isolation functions by pouring silicone oil by means of an oil hole.

On the basis of the prior art, the inventors add a gravity balance mechanism into a vertical vibration isolator to form a dynamic balance type vertical vibration isolator, which has the following characteristics: (1) under an action of an earthquake, an upward dynamic generated by a device is not changed; (2) a vertical vibration isolation function is provided by means of stiffness-adjustable springs; (3) a pure mechanical structure is provided, such that no dynamic supply is required, and electronic components are not used; and (4) the vibration isolator is small in size and is used for vertical vibration isolation of apparatuses or cultural relics.

SUMMARY

The present disclosure relates to a dynamic balance type vertical vibration isolator, which mainly solves the technical problem of vertical dynamic balance and has an excellent vertical vibration isolation function.

In order to realize the above objective, the technical solution of the present disclosure is as follows:

Components of the vibration isolator include slide blocks, balance springs, mass blocks, a fixed block, rotation shafts, stiffness-adjustable springs, horizontal guide rods, vertical rods, a vibration isolator top plate and a housing. A connection mode is as follows: dynamic balance systems are arranged in the housing. The slide blocks are vertically connected to the mass blocks, the slide blocks are positioned at a lower side, the mass blocks are positioned at an upper side, and each slide block is horizontally connected to one end of the corresponding balance spring. The slide blocks sleeve the horizontal guide rods, and the slide blocks may slide along the horizontal guide rods. The other end of each balance spring is connected to the fixed block, and deformation quantities of the balance springs change when the slide blocks and the mass blocks slide along the horizontal guide rods. Each rotation shaft is arranged at one end of the corresponding horizontal guide rod, the rotation shafts are connected to the fixed block, and the fixed block is connected to the housing. The slide blocks, the balance springs, the mass blocks, the fixed block, the rotation shafts and the horizontal guide rods form one power balance system, and two dynamic balance systems are symmetrically arranged by taking the fixed block as a center and share the same fixed block. An upper part of the other end of each horizontal guide rod is connected to a lower end of the corresponding vertical rod, and a lower part thereof is connected to an upper end of the corresponding stiffness-adjustable spring. Lower ends of the stiffness-adjustable springs are connected to the housing. Upper ends of the vertical rods are connected to the vibration isolator top plate. Rolling wheels are arranged at the upper ends of the vertical rods and are embedded in a rail of a lower surface of the vibration isolator top plate, an object subjected to vibration isolation is placed on the vibration isolator top plate, and the stiffness-adjustable springs, the vertical rods, the vibration isolator top plate and the housing form a vertical vibration isolation system.

There are one fixed block, one vibration isolator top plate and one housing, and the fixed block is fixed in a center of an interior of the housing.

The slide blocks, the fixed block, the vibration isolator top plate and the housing are cuboids, cubes or cylinders, and the vertical rods are cuboids or cylinders.

Each component is made of stainless steel or an aluminum alloy.

Figure 1:
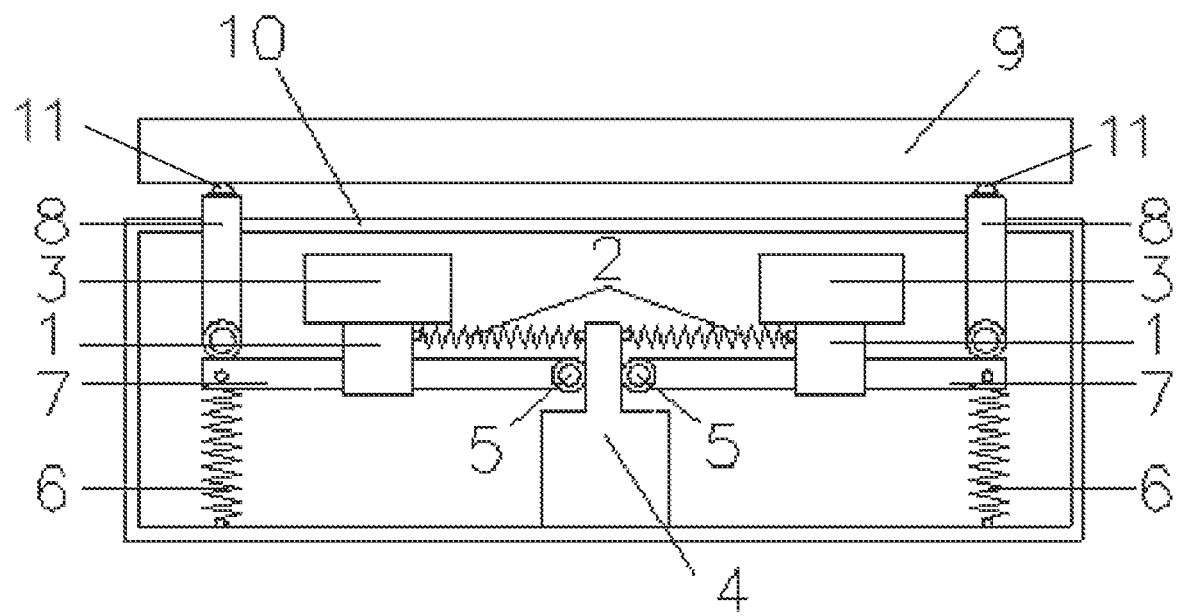
FIG. 1 is a plane view of a dynamic balance type vertical vibration isolator.

In the accompanying drawings: slide block 1, balance spring 2, mass block 3, fixed block 4, rotation shaft 5, stiffness-adjustable spring 6, horizontal guide rod 7, vertical rod 8, vibration isolator top plate 9, housing 10, and rolling wheels 11.

DETAILED DESCRIPTION OF THE EMBODIMENTS

The present disclosure will be further described below with reference to the accompanying drawings and the specific implementations.

Figure 2:
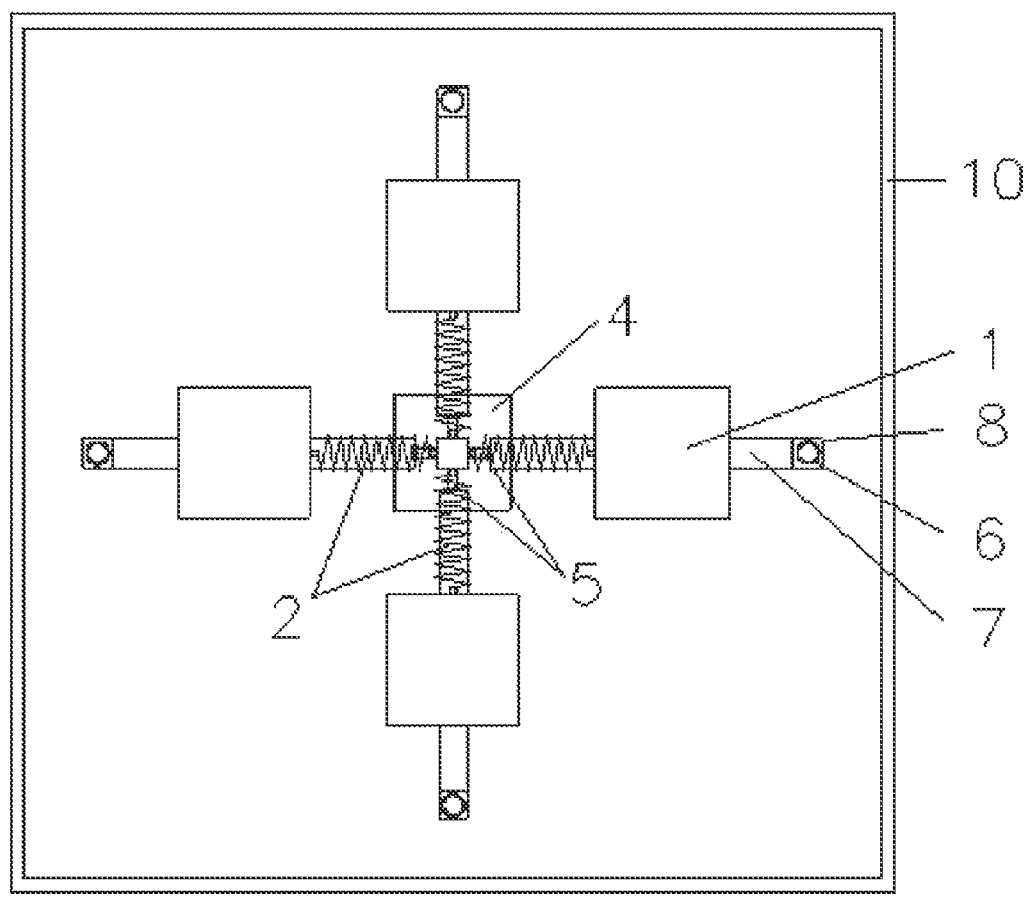
FIG. 2 is a top view of an interior of a dynamic balance type vertical vibration isolator.

FIG. 1 is a plane view of a dynamic balance type vertical vibration isolator. FIG. 2 is a top view of an interior of a dynamic balance type vertical vibration isolator.

When an earthquake force is upward, the stiffness-adjustable springs 6 are compressed, upward forces of the stiffness-adjustable springs 6 are increased, meanwhile, the slide blocks 1 and the mass blocks 3 move away from the fixed block 4, the balance springs 2 are stretched to generate pull forces, and the pull forces have vertically upward components, so as to reduce compression degrees of the stiffness-adjustable springs 6, and further to reduce the upward forces of the stiffness-adjustable springs 6. Similarly, when the earthquake force is downward, the stiffness-adjustable springs 6 are stretched, downward forces of the stiffness-adjustable springs 6 are increased, meanwhile, the slide blocks 1 and the mass blocks 3 move close to the fixed block 4, the balance springs 2 are compressed to generate compression forces, and the compression forces have vertical downward components, so as to reduce stretch degrees of the stiffness-adjustable springs 6, and further to reduce the downward forces of the stiffness-adjustable springs 6. Therefore, forces of the stiffness-adjustable springs 6 on vertical rods 8 are constant, so as to realize dynamic balance and vertical vibration isolation.

Computation and adjustment methods for a vibration isolation frequency is as follows: after gravity of an object 11 subjected to vibration isolation is balanced by balance springs 2, assuming that mass of the object 11 subjected to vibration isolation is m, by regarding the object 11 subjected to vibration isolation as a single degree of freedom system, the vibration isolation frequency $$\omega = \sqrt{\frac{K}{m}}$$

is computed according to stiffness K of a stiffness-adjustable spring 6. The adjustment method is to select stiffness-adjustable springs 6 having different stiffnesses for adjustment.

A function of mass blocks 3 is to increase a dynamic balance force.

What is claimed is:

1. A dynamic balance type vertical vibration isolator, comprising slide blocks, balance springs, mass blocks, a fixed block, rotation shafts, stiffness-adjustable springs, horizontal guide rods, vertical rods, a vibration isolator top plate and a housing;

wherein dynamic balance systems are arranged in the housing, each of the slide blocks is vertically connected to each of the mass blocks, the slide blocks are positioned at a lower side of the mass blocks, the mass blocks are positioned at an upper side of the slide blocks, and each of the slide blocks is horizontally connected to a first end of the balance spring corresponding to each of the slide blocks;

each of the slide blocks sleeve each of the horizontal guide rods, and the slide blocks are configured to slide along the horizontal guide rods;

a second end of each of the balance springs is connected to the fixed block, and a deformation quantity of each of the balance springs change when the slide blocks and the mass blocks slide along the horizontal guide rods;

each of the rotation shafts is arranged at a first end of the horizontal guide rod corresponding to each of the rotation shafts, the rotation shafts are connected to the fixed block, and the fixed block is connected to the housing;

the slide blocks, the balance springs, the mass blocks, the fixed block, the rotation shafts and the horizontal guide rods form one of the dynamic balance systems, and two of the dynamic balance systems are symmetrically arranged by taking the fixed block as a center and the two of the dynamic balance systems share the same fixed block;

an upper part of a second end of each of the horizontal guide rods is connected to a lower end of the vertical rod corresponding to each of the horizontal guide rods, and a lower part of the second end of each of the horizontal guide rods is connected to an upper end of the stiffness-adjustable spring corresponding to each of the horizontal guide rods;

a lower end of each of the stiffness-adjustable springs is connected to the housing; an upper end of each of the vertical rods is connected to the vibration isolator top plate; and a rolling wheel is arranged at the upper end of each of the vertical rods and the rolling wheel is attached to a lower surface of the vibration isolator top plate, an object subjected to a vibration isolation is placed on the vibration isolator top plate, and the stiffness-adjustable springs, the vertical rods, the vibration isolator top plate and the housing form a vertical vibration isolation system.

2. The dynamic balance type vertical vibration isolator according to claim 1, wherein one fixed block, one vibration isolator top plate and one housing are arranged, and the fixed block is fixed in a center of an interior of the housing.

3. The dynamic balance type vertical vibration isolator according to claim 1, wherein each of the slide blocks, the fixed block, the vibration isolator top plate and the housing are selected from one of the group consisting of a cuboid, a cube and a cylinder, and each of the vertical rods is the cuboid or the cylinder.

4. The dynamic balance type vertical vibration isolator according to claim 1, wherein each component is made of stainless steel or an aluminum alloy.

* * * * *